United States Patent [19]
Karalus et al.

[11] Patent Number: 4,968,419
[45] Date of Patent: Nov. 6, 1990

[54] DOCUMENT PROCESSING SYSTEM

[75] Inventors: George C. Karalus, Arlington Heights; Anthony J. DiTomasso, Elk Grove Village, both of Ill.

[73] Assignee: AES Technology Systems, Inc., Elk Grove Village, Ill.

[21] Appl. No.: 98,451

[22] Filed: Sep. 18, 1987

[51] Int. Cl.⁵ .............................................. B07C 1/06
[52] U.S. Cl. .................................. 209/539; 209/541; 209/545; 209/900
[58] Field of Search ............... 209/534, 540, 541, 545, 209/900; 271/65, 184–186

[56] References Cited

U.S. PATENT DOCUMENTS

| | | |
|---|---|---|
| 2,947,406 | 8/1960 | Hazelton, Jr. . |
| 3,266,626 | 8/1966 | Simjian ................................. 209/545 |
| 3,622,151 | 11/1971 | Range et al. . |
| 3,750,880 | 8/1973 | Petrovsky et al. ............... 209/539 X |
| 3,938,435 | 2/1976 | Suda et al. . |
| 4,119,194 | 10/1978 | Freeman et al. ................. 209/900 X |
| 4,625,870 | 12/1986 | Nao et al. .............................. 209/534 |
| 4,863,037 | 9/1989 | Stevens et al. .................... 209/540 X |

FOREIGN PATENT DOCUMENTS

| | | |
|---|---|---|
| 1349353 | 12/1963 | France . |
| 0153408 | 12/1961 | U.S.S.R. ................................ 209/900 |
| 1124099 | 8/1968 | United Kingdom ................ 209/900 |

OTHER PUBLICATIONS

Xerox Disclosure Journal, vol. 7, No. 1, Jan./Feb., 1982—pp. 11–12, U.S. patent application Ser. No. 445,589, filed Nov. 30, 1982, now abandoned.

*Primary Examiner*—Margaret A. Focarino
*Assistant Examiner*—Edward M. Wacyra
*Attorney, Agent, or Firm*—Dressler, Goldsmith, Shore, Sutker & Milnamow, Ltd.

[57] ABSTRACT

A method and apparatus are provided for processing documents in a path wherein the documents each have first and second ends. Some of the documents have the first end being the leading end, and others of the documents have the second end being the leading end. The documents are conveyed to a receiver. The documents with the first end leading are conveyed into one end of the receiver. The documents with the second end leading are conveyed into the other end of the receiver from the opposite direction. The documents in the receiver then all have the same end orientation in the receiver. Two documents may initially be fed one on top of the other between a rotating wheel and retard pad. This selectively retards one document against the pad until the other document has been fed further forwardly beyond the leading edge of the one document.

5 Claims, 10 Drawing Sheets

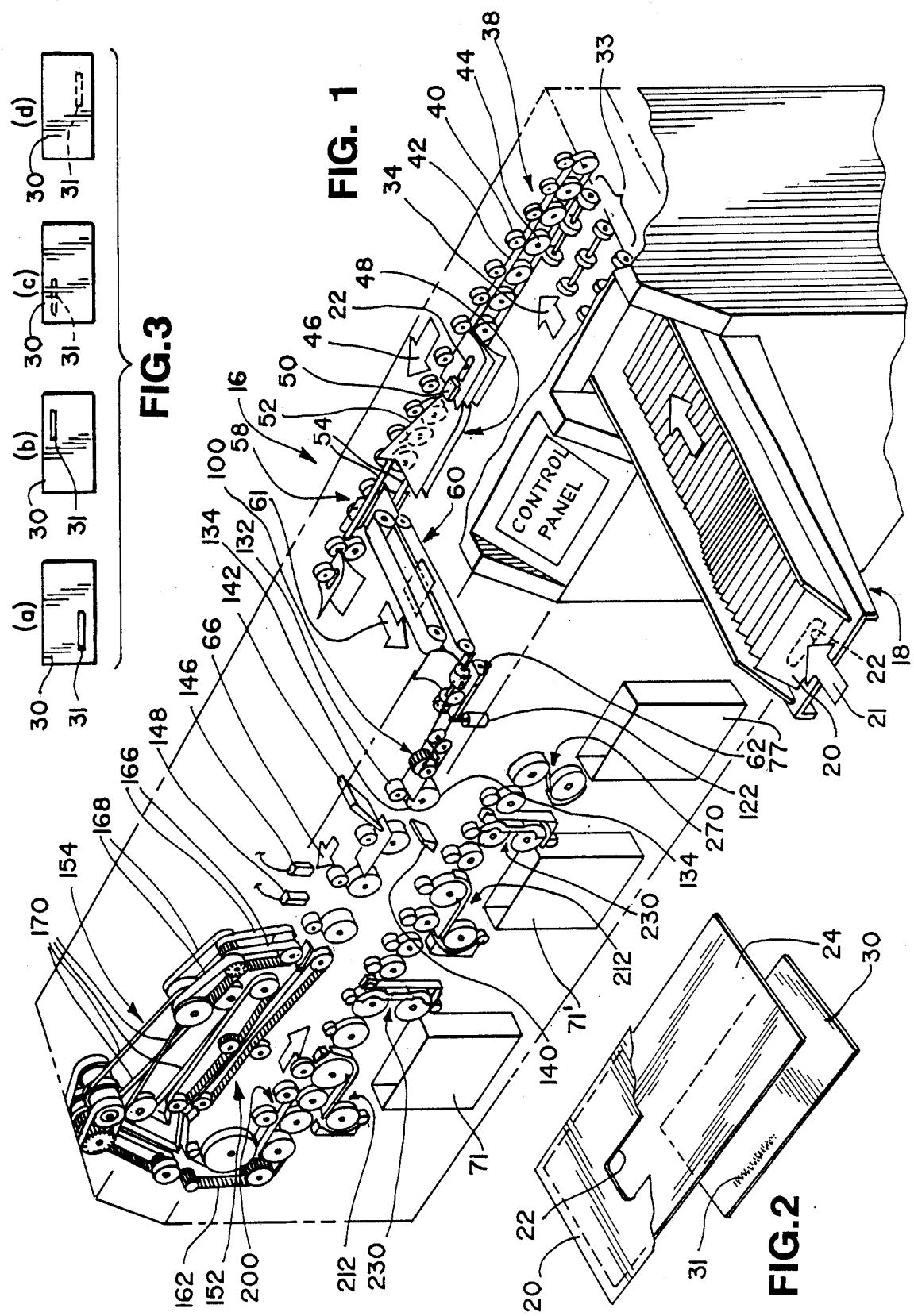

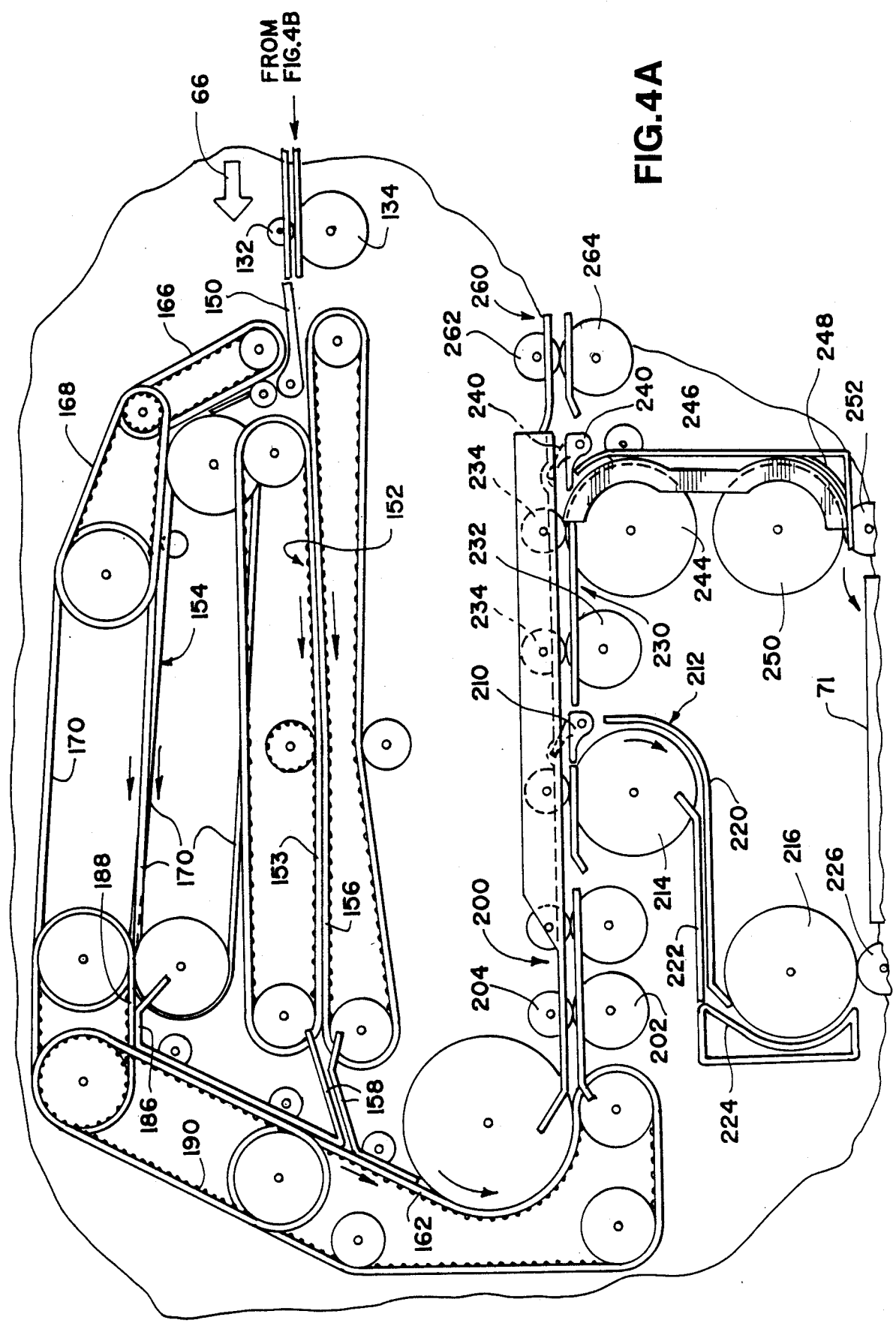

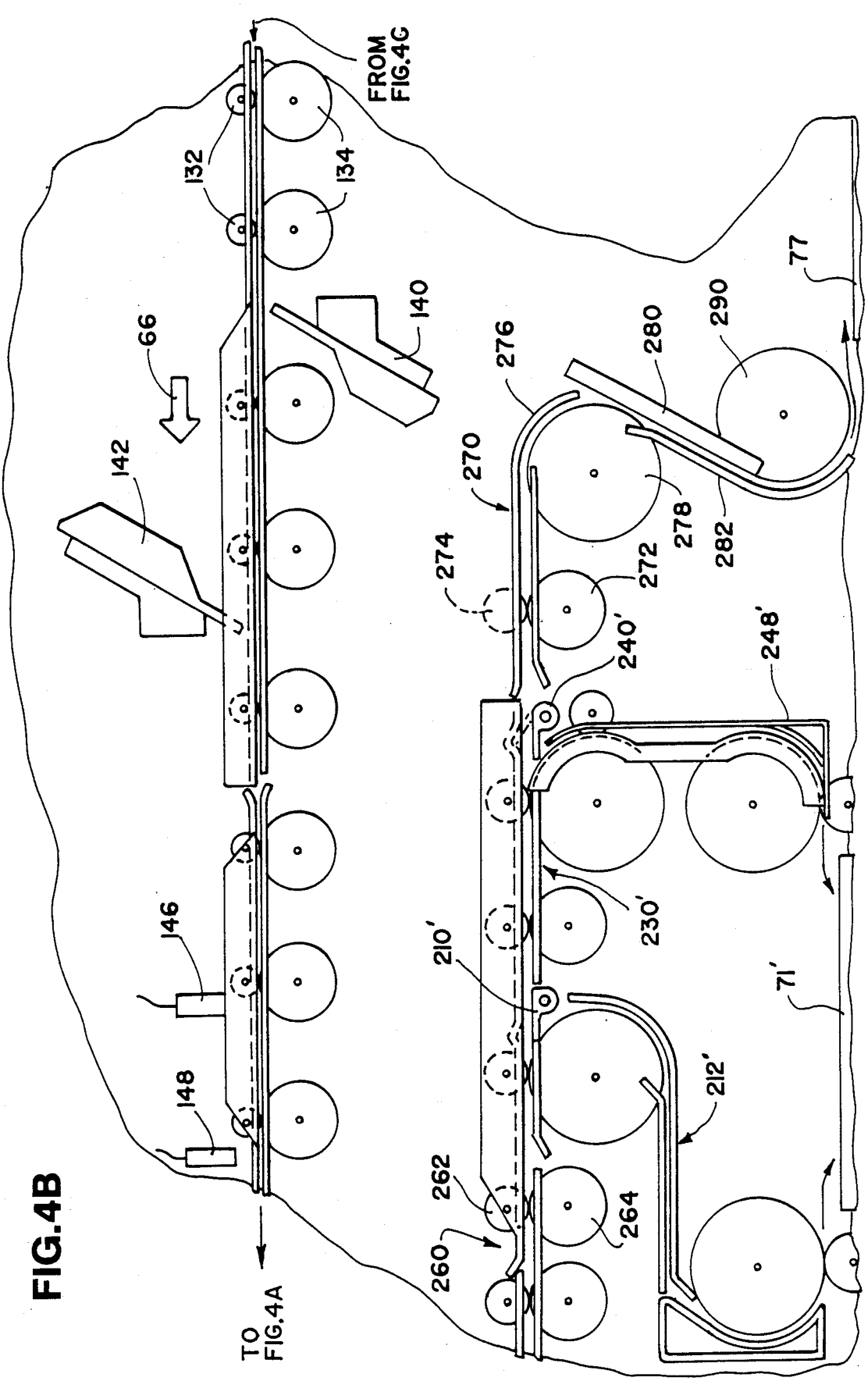

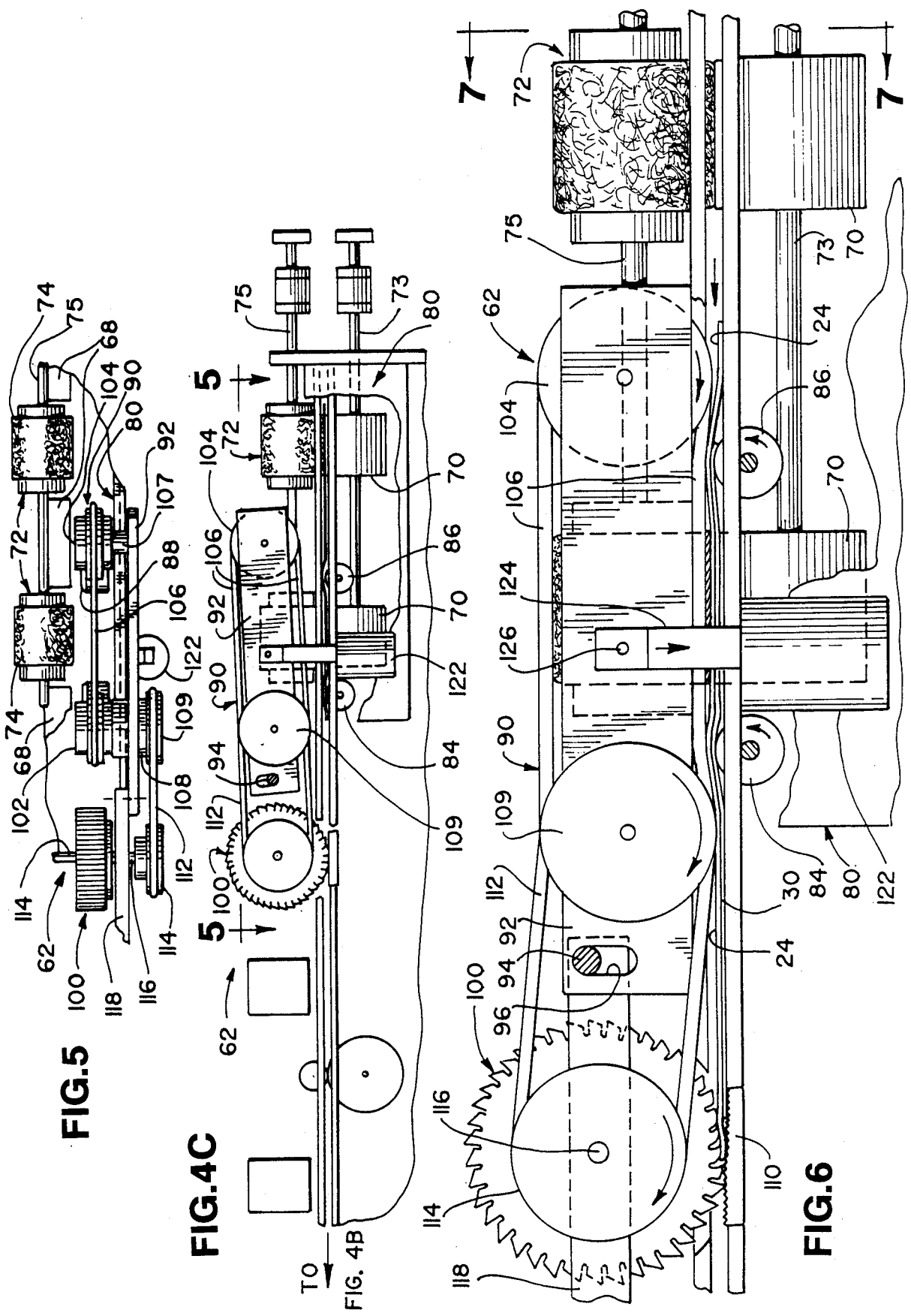

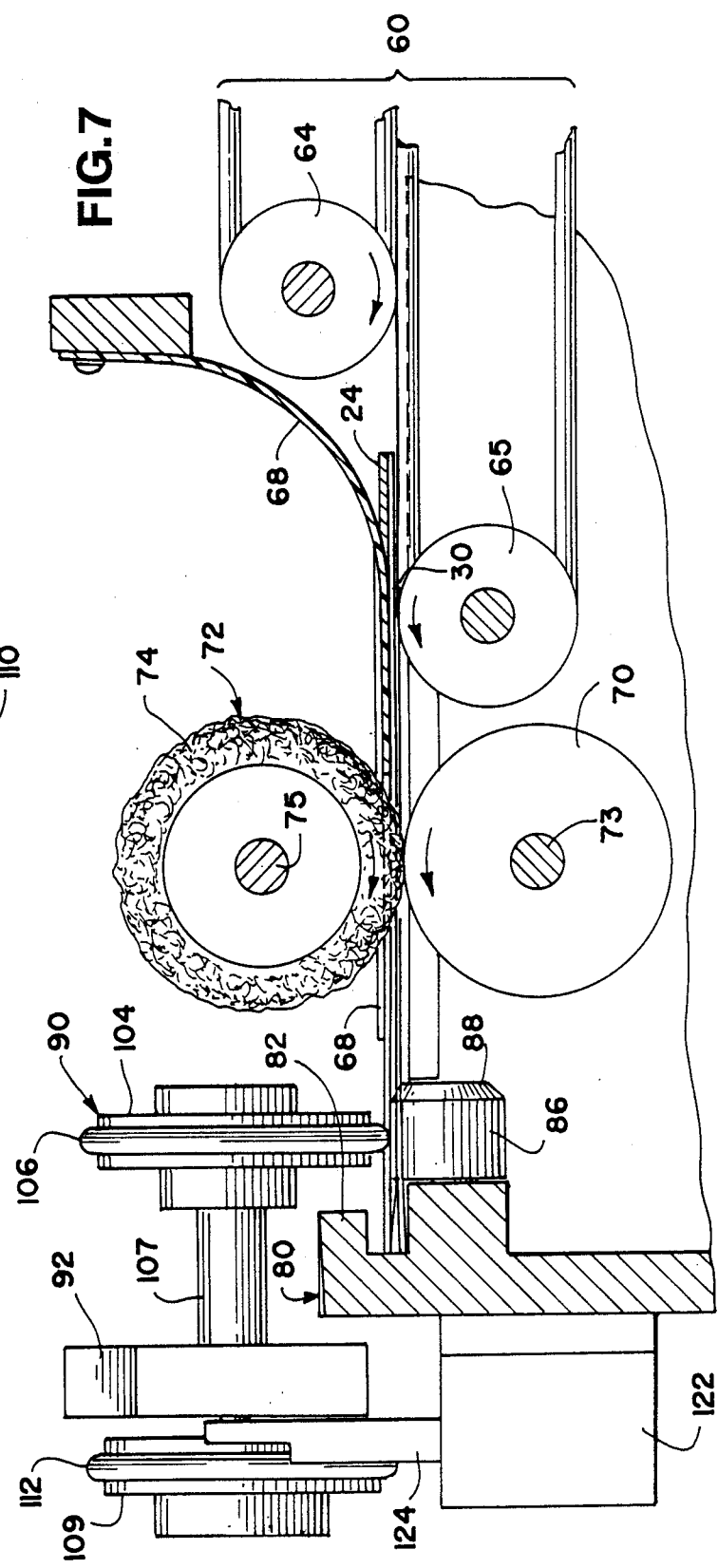
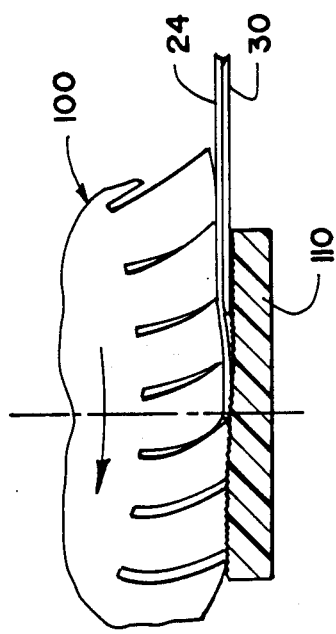
FIG.7
FIG.8

DOCUMENT PROCESSING SYSTEM

TECHNICAL FIELD

This invention relates to document processing, and more particularly to automatic orienting of selected documents with respect to positioning a selected end and face of each document in a predetermined orientation. The system of the present invention is especially adapted for use with documents extracted from envelopes, such as an invoice return portion and an associated payment check.

BACKGROUND OF THE INVENTION AND TECHNICAL PROBLEMS POSED BY THE PRIOR ART

One of the major problems in various large volume, commercial, document processing environments, such as those that involve the receipt and processing of documents through the mail, is the inefficiency of (1) opening envelopes to obtain access to the documents therein, (2) extracting those documents from the envelopes, and (3) subsequent handling and processing. For example, in remittance processing it is necessary to obtain access to the documents within the envelope, and these documents typically comprise a check and an invoice return portion from the statement for which payment is being made. This invoice return portion of the statement may also be referred to as a "remittance document" or "turnaround document".

Typical major remittance processing operations are often required to process large quantities of documents mailed in envelopes that can, for example, range on the order of about 70,000 to 150,000 envelopes on average each day. Peak loads may increase, for example, to numbers on the order of 300,000 envelopes per day.

The problem of opening these large numbers of envelopes daily, of extracting the contents, and of processing the contents is a major one. While there are a variety of commercial processing machines available, historically those machines had very limited capability and were not much more efficient than manually processing the envelopes and contents.

Recently, applicants' assignee has introduced an envelope opening system which is capable of opening envelopes at extremely high volumes, e.g., 20,000–30,000 per hour. An example of such an apparatus is disclosed in U.S. Pat. Nos. 4,356,679, 4,356,683 and 4,356,684. Such apparatus is not only capable of opening envelopes at rates and volumes that were previously totally unheard of, but is also capable of opening the envelopes along three edges to provide ready access to the contents of the envelopes.

To obtain maximum benefit from such an envelope opening system, it would be desirable to be able to remove the contents from the opened envelopes automatically and efficiently. If, in addition, the documents removed from the envelopes could be sorted and arranged with a desired orientation for subsequent use, (e.g., for data entry and other operations normally associated with remittance processing), then the overall efficiency would be improved and the costs associated therewith could be drastically reduced.

SUMMARY OF THE INVENTION

In accordance with the present invention, there is provided a method and apparatus for automatically processing documents, and in the preferred embodiment, the method and apparatus is adapted for separating and orienting documents extracted from envelopes that have been opened along three edges.

One form of the method includes selecting and moving one of the documents from a selected initial location in a path to a receiving station with one end of the document leading a trailing end. This is effected while maintaining the document leading end at non-zero velocities so as to avoid stopping the document or abruptly changing direction of the document. During this process, the end-for-end orientation of the document is reversed relative to a reference coordinate system fixed in relation to the selected initial location of the document. The reversed document is then discharged to the receiving station with the one end still leading the trailing end.

In another aspect of the invention, a document is transported with a first end leading from a common transport path and along a first discharge path into one end of the receiving station. Another document is transported with the other (second) end leading from the common transport path and along a second discharge path into the receiving station from an opposite end of the receiving station. Both documents in the receiving station will thus have the same end orientation.

A preferred embodiment of the apparatus of the present invention includes means, such as a conveyor system, for moving one of the selected documents along the above-described transport paths.

The processing system of the present invention has been found to be highly effective in efficiently handling documents at a high rate of speed. The preferred embodiment of the system eliminates the undesirable operation found in those prior art systems which, during the conveying of a document, momentarily stop the leading edge of the document or the entire document and abruptly change the direction of the document movement. This can result in a discontinuous or abrupt change in momentum of the document transporting system and/or of the document per se. In contrast, the present invention accommodates changes in document and machine component momentum in a continuous and gradual manner. This permits the documents to be efficiently handled at a high rate of speed.

Further, in the preferred embodiment of the invention, the document transport paths may be arranged in alignment so that the lateral edges of the document conveying system lie in two spaced-apart, parallel planes. That is, in the conventional X, Y, Z orthogonal coordinate system, the documents may be moved in paths entirely in the X and Y directions with no need to move the documents in the Z direction. This permits the apparatus to be constructed in a relatively compact arrangement and eliminates more complex and longer document transport paths.

In another aspect of the invention, apparatus is provided for separating two planar documents that are disposed face-to-face. The apparatus includes means for defining a document transport path for the documents and a first feed means for feeding the two documents along the transport path. A second feed means is provided in the transport path for frictionally engaging and further feeding the documents along the transport path.

A retard means is provided adjacent the second feed means for frictionally engaging a surface of one of the documents whereby the one document is restrained from moving downstream of the second feed means until the other of the two documents is fed by the second feed means past the one document and whereby the second feed means subsequently engages and feeds the remaining one document.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a simplified, fragmentary, perspective view of the apparatus of the present invention with portions of the exterior housing broken away to better illustrate interior detail;

FIG. 2 is an exploded, perspective view of a standard window envelope partially broken away to show an invoice return portion with an address thereon disposed adjacent the envelope window and to show a check disposed behind the invoice return portion;

FIG. 3 is a plan view of a check shown in each of four different orientations;

FIG. 4A is a greatly enlarged, fragmentary, simplified, front elevational view of the left-hand end of the orienting portion of the apparatus;

FIG. 4B is a greatly enlarged, fragmentary, simplified, front elevational view of the right-hand end of the orienting portion of the apparatus;

FIG. 4C is an enlarged, fragmentary, simplified, front elevational view of the document separating portion of the apparatus which is adjacent the right-hand end of the document orienting portion of the apparatus;

FIG. 5 is a fragmentary plan view taken generally along the plane 5—5 in FIG. 4C;

FIG. 6 is a view similar to FIG. 4C, but more greatly enlarged and showing the document transport O-ring drive in a lowered position engaging the documents;

FIG. 7 is a fragmentary, cross-sectional view taken generally along the plane 7—7 in FIG. 6;

FIG. 8 is a view similar to FIG. 6 but greatly enlarged and showing the retard pad and portion of the feed wheel that are illustrated at the left-hand end of FIG. 6;

DESCRIPTION OF THE PREFERRED EMBODIMENTS

Figure 9:
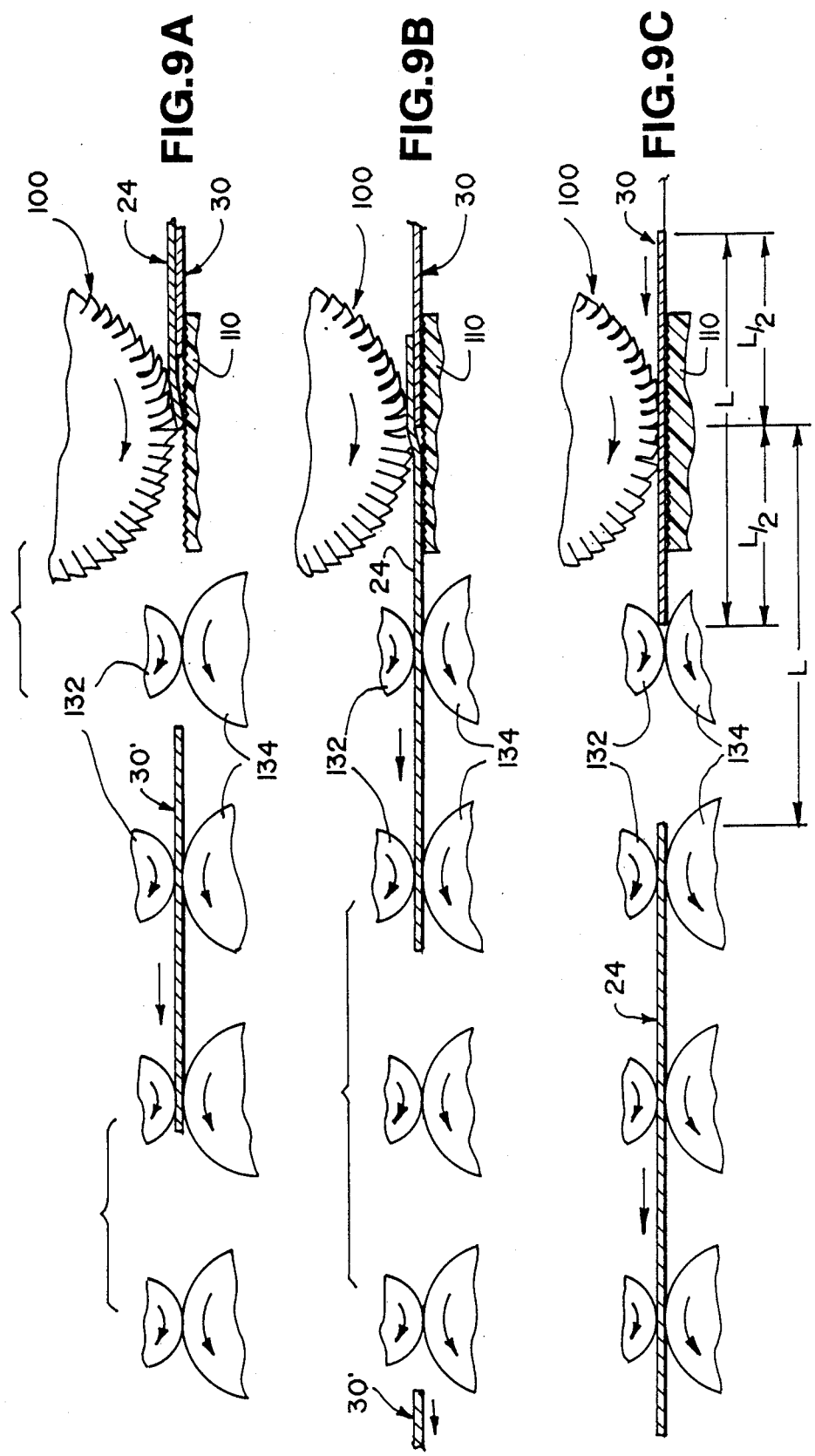
FIGS. 9A, 9B, and 9C are simplified, fragmentary, front elevational, diagrammatic views of the retard pad, feed wheel, and downstream transport path showing the sequence of document separation.

While this invention is susceptible of embodiment in many different forms, this specification and the accompanying drawings disclose only some specific forms as examples of the use of the invention. The invention is not intended to be limited to the embodiments so described, and the scope of the invention will be pointed out in the appended claims.

For ease of description, the apparatus of this invention is described in the normal (upright) operating position, and terms such as upper, lower, horizontal, etc. are used with reference to this position. It will be understood, however, that the apparatus of this invention may be manufactured, stored, transported, and sold in an orientation other than the position described.

The apparatus of this invention is used with certain conventional components the details of which, although not fully illustrated or described, will be apparent to those having skill in the art and an understanding of the necessary functions of such components.

Some of the Figures illustrating the preferred embodiments of the apparatus show structural details and mechanical elements that will be recognized by one skilled in the art. However, the detailed descriptions of such elements are not necessary to an understanding of the invention, and accordingly, are not herein presented. —General Arrangement Of The Apparatus Referring now to the drawings, the general arrangement and operation of the apparatus can best be understood with reference to FIG. 1. An envelope processing machine 16 is illustrated in FIG. 1 as having a document in-feed or feeder 18 for feeding documents, such as envelopes 20, into the machine 16 in the direction of the arrow 21.

Each envelope in the feeder 18 has been opened on three edges—along the bottom edge and along both vertical end edges. The envelopes 20 may have been so opened by suitable conventional apparatus, such as that disclosed in the U.S. Pat. Nos. 4,356,679, 4,356,683 and 4,356,684. Each envelope opened by such apparatus has its two panels in registry and connected along the top edge of the envelope while the panels are unconnected ("open") along the three remaining edges.

The particular form of the machine 16 illustrated is especially adapted for orienting documents contained in the envelopes 20 wherein, as best illustrated in FIG. 2, each envelope 20 has a conventional window 22 and contains a statement or invoice return portion 24 (hereinafter designated as the "invoice" 24) and an underlying check 30. The invoice 24 is, of course, typically placed in the window envelope 20 so that the payee's address on the invoice is visible through the envelope window 22. Thus, the orientation of the invoice 24 in the envelope 20 can be assumed to be in the proper orientation.

The position of the check 30 relative to the invoice 24 is also assumed since the check 30 must be behind the invoice 24 if the invoice address is to appear in envelope window 22. However, the orientation of the check per se in the envelope, with respect to the position of the check's printed face and top edge, could vary.

There are four possible orientations for the check 30 as illustrated in FIG. 3. A conventional personal check in the United States of America is printed with standard American Banking Association characters 31 (hereinafter designated "ABA characters"). When the printed face of a check 30 is disposed face up so that it can be read when viewed normally, the ABA characters 31 are in the lower left-hand corner of the check as illustrated in FIG. 3, position (a). The check 30, may be placed behind the invoice 24 in this orientation as indicated in FIG. 2.

In another orientation, the check 30 may be maintained face up, but inverted upside down as illustrated in position (b) of FIG. 3. Alternatively, the check may be turned over face down with the ABA characters 31 along the top as illustrated in position (c) of FIG. 3 or with the ABA characters 31 along the bottom edge as illustrated in position (d) of FIG. 3.

The machine 16 is adapted to process the envelopes 20 with the check 30 in any of the four possible positions along with the pre-positioned invoice 24. The apparatus 16 opens the envelopes, detects whether the envelopes are of the proper thickness (i.e., contains the proper number of documents), identifies and segregates exceptions (e.g., those envelopes having a thickness indicative of more or less than two documents or which do not contain checks), extracts the documents from the envelopes, orients the check, and discharges the oriented check and invoice in a preselected order to a bin for subsequent processing.

The envelopes 20 are loaded into the feeder 18 in a selected orientation. In the embodiment illustrated, the envelopes 20 are loaded with the top edge down and the windows 22 facing toward the back of the machine 16. The envelopes 20 are fed seriatim in a conventional manner by the feeder 18 onto a suitable conventional conveying mechanism 33 which conveys each envelope along a process path (identified by arrow 34 in FIG. 1) so that each envelope window 22 is facing upwardly and so that the top edge of the envelope is the leading edge.

The envelopes 20 are conveyed one at a time in path 34 past a first envelope sensor (not illustrated). The time required to reach the sensor is governed by a feed signal produced by a control system. If an envelope 20 does not reach the first sensor within a selected interval which is sufficient to allow for two feed attempts, the machine 16 shuts down. If the envelope 20 is properly fed, it is transported to a first, conventional gross thickness detector (not illustrated) which detects whether the envelope is within thickness limits generally indicative of the proper number of documents contained within the envelope.

If the envelope is too thick, it is automatically discharged through a gate (not illustrated) to a suitable receiver (not illustrated). If the envelope 20 is not too thick, it passes over the gate and is detected by a second sensor (not illustrated) to determine that the envelope has reached that position within the selected time interval. The time measurement throughout the system is from stage to stage as well as a cumulative measurement.

Properly fed envelopes 20 (which are not rejected as exceptions) are conveyed to a transverse transport mechanism 38 which includes a set of upper rollers 40 and a lower drive belt 42 that is trained around a set of lower rollers 44. The upper rollers 40 are initially raised by suitable mechanisms, such as electric solenoid actuators (not illustrated), to allow the unopened top edge of the envelope 20 to be fed by conveyor 33 between the rollers 40 and a drive belt 42. The rollers 40 are then lowered so that the rollers 40 and belt 42 grasp the closed side of the envelope to transport it in a direction (designated by arrow 46) which is generally transverse to the initial feed direction 34.

It has been found in some applications that the drive belt 42 may be advantageously replaced with separate drive rollers. Maintenance of separate drive rollers is easier compared to removal and replacement of a long belt and compared to adjustment procedures for keeping the belt properly tracking on its support rollers. In any event, the details of the mechanism for conveying the envelopes form no part of the present invention.

In the transport mechanism 38, the envelope 20 is carried along the path 46 to an envelope spreader mechanism 48 which includes a pair of vertically aligned, self-balancing, top and bottom vacuum plates which draw the envelope top and bottom panels open by use of a vacuum. Upper vacuum plate 50 is visible in FIG. 1.

The envelope 20 is then transported over a pair of stainless steel "plows" 52 which cause the envelope panels to ride over the outside of the plows while the contained documents pass between the plows. The unopened edge of the envelope 20 is retained between the upper rollers 40 and the belt 42 during the transportation of the envelope along the plows 52 as the envelope panels are separated to expose the contents. Rails 54 extending from the plows 52 hold the panels in the open position downstream of the plows 52.

A pair of conventional sensors (not illustrated) detect the envelope panels that have been opened and sense that the panels are generally displaced vertically up and down. The failure of either of these sensors to detect a vertically disposed envelope panel within the appropriate time period indicates a faulty operation.

Another conventional sensor (not illustrated) is provided to detect the leading end of the retained margin portion along the unopened edge of the envelope to ensure that some detection occurs even if the envelope is not opened.

The thickness of the documents are sensed by a suitable conventional document thickness detector (not illustrated) which is preset to measure the thickness of two documents. The sensitivity of this thickness detector is such that it can sense the differences among a single document, two documents and more than two documents.

The signal from the thickness detector is sampled a selected time period after the signal from the detector is first produced. This is to ensure that all documents in the envelope are being detected because of the variable size of the documents and the fact that some checks are smaller than the invoice documents and vice versa.

If the sensed thickness of the documents is indicative of less than or more than two documents, the documents are not extracted from the envelope. The envelope is instead conveyed past the ends of the rails 54 so that the envelope panels close. It is then discharged into a suitable exception receiver (not illustrated).

If two documents are present in the envelope, the envelope 20 is conveyed through an extraction station 58, and the envelope contents are extracted as the envelope is moving through the station 58. To this end, the envelope is detected by a sensor (not illustrated) located about midway across the extraction station 58 between two drive wheels (not illustrated). Upon detection of the envelope, a suitable extraction device (not illustrated) drops to pinch the documents between extraction drive wheels and idler rollers (not illustrated) which operate to pull the two documents out of the envelope. The empty envelope is conveyed by belt 42 away from the extraction station 58 so that the envelope panels close, and the envelope is then discharged to an envelope receiving station (not illustrated).

The envelope opening and document extracting mechanisms of the machine 16 that have so far been described may be of special or conventional design. The embodiments of such mechanisms illustrated herein are described in more detail in U.S. patent application Ser. No. 445,589 filed Nov. 30, 1982, now abandoned. However, it is to be realized that the apparatus and method of the present invention are not limited to use with the above-described envelope opening and document extracting mechanisms. The detailed design and specific structure of such envelope opening and document extracting mechanisms form no part of the present invention. Indeed, the method and apparatus of the present invention may be employed with one or more documents that are introduced by other means, including manually, and may also be employed with documents that may be arranged differently than illustrated.

From the document extraction station 58, the pair of documents 24 and 30 are transported along a path designated by arrow 61 (which is transverse to the path of the envelope 20). This may be effected with suitable means, such as a conventional endless belt drive 60, to transport the documents to a squaring and separating station 62. The detailed design and specific structure of the drive 60 form no part of the present invention.

At the end of the drive 60, the documents are aligned at the squaring and separating station 62, the details of which are described hereinafter. Generally, the documents are each aligned along one edge at the station 62, and then the documents are separated by moving the upper invoice 24 perpendicular to the path of the drive 60 in the direction of the arrow 66. The check 30 follows, but is spaced behind the trailing edge of the invoice 24.

The invoice 24 is fed along the path 66 and ultimately to a receiving bin 71 in which the invoice is deposited face down with the bottom edge of the invoice adjacent the front of the machine.

The following check 30 is processed along the path 66 to orient the check as may be necessary, and by means described in detail hereinafter, so that it is similarly deposited face down in the bin 71 on top of the invoice 24 with the bottom edge of the check 30 adjacent the front of the bin 71.

When the bin 71 is filled, the machine 16 automatically processes the documents to an adjacent second bin 71'. Documents that cannot be properly processed and deposited in the bins 71 and 71' in the correct orientation are fed to a rejection bin 77.

The methods and mechanisms for processing the documents downstream of the document extracting station 58 will next be described in detail.

The invoice 24 and underlying check 30 are transported, with the invoice 24 stacked on top of the check 30, from the extraction station 58 by means of a suitable, special or conventional transport system, such as a set of endless belts in the endless belt drive 60. With reference to FIG. 7, the endless belt drive 60 is seen to terminate at upper rollers 64 and lower rollers 65 adjacent a flexible plastic guide plate 68 which curves downstream and which functions to hold down the invoice 24 and underlying check 30 as they pass beneath it.

The documents are fed by belt drive 60 into the nip of lower rollers 70 and upper rollers 72. The lower rollers 70 are preferably fabricated from foamed polyurethane, and these rollers 70 contact the bottom surface of the check 30. The lower rollers 70 are mounted on a shaft 73 that is suitably mounted for rotation in the machine and driven by suitable conventional means (not illustrated).

The upper rollers 72 are preferably fabricated from metal or a thermoplastic material but are wrapped with a lamb's wool covering 74 which contacts the upper surface of the invoice 24. The upper rollers 72 are mounted on a shaft 75 which is suitably mounted for rotation in the machine and driven by a suitable conventional means (not illustrated).

The coefficient of friction between the bottom of the check 30 and the lower roller 70 is greater than the coefficient of friction between the top surface of the invoice 24 and the lamb's wool-covered rollers 72. Further, the coefficient of friction between the bottom surface of the check 30 and the lower roller 70 is greater than the coefficient of friction between the top surface of the check 30 and the bottom surface of the overlying invoice 24. This insures that the check 30 will be driven by the bottom rollers 70 even if the invoice document 24 is held stationary.

Downstream of the rollers 70 and 72 is an alignment plate 80 against which the lateral edges of the invoice 24 and check 30 are driven. The plate 80 includes an overhanging lip 82, as best illustrated in FIG. 7, to prevent excessive upward deflection of the ends of the documents as they hit the plate 80. The rollers 70 and 72 are continuously rotating so that both documents are eventually driven against the alignment plate 80 and so that the leading edges of both documents become engaged with, and aligned parallel to, the alignment plate 80.

Typically, the height of the invoice 24, from the bottom edge of the invoice to the top edge of the invoice, is greater than the height of the check 30. Thus, the leading edge of the invoice 24 may contact the alignment plate 80 first. Since the bottom rollers 70 are continuously rotated, and since the coefficient of friction between the rollers 70 and the check is sufficiently great, the check continues to move underneath the stopped invoice 24 until the bottom edge of the check also hits the alignment plate 80.

The force exerted on the documents by the rollers 70 and 72 is sufficient to align the documents against the plate 80, but not strong enough to cause the documents to buckle. The rollers 70 and 72 continue rotating and "slipping" over the document surfaces after the documents have been stopped by the alignment plate 80. To ensure that the documents do not buckle against the alignment plate 80, the rollers 70 and 72 are located relatively close to the alignment plate 80.

Further, the documents are somewhat curled in a very shallow undulation along the length of each document as best illustrated in FIG. 6. This slight curled or undulation configuration is created by two spaced-apart idler rollers 84 and 86 which are mounted to the alignment plate 80 and extend outwardly below the bottom surface of the check 30. The uppermost point on each roller 84 and 86 is at an elevation that is slightly greater than the lowermost point of each lamb's wool-covered roller 72. Further, each idler roller 84 and 86 has, as best illustrated in FIG. 7 for roller 86, a tapered end or frustoconical end 88. The leading edges of the check 30 and the overlying invoice 24 can thus ride up the frustoconical surface 88 of roller 86 and up the similar surface on the other roller 84.

This creates the upperwardly convex curve on either side of the left-hand upper roller 72 as best illustrated in FIGS. 4C and 6. This curvature created in the documents adds column strength to the documents and further ensures that they do not buckle against the alignment plate 80.

The upper rollers 72 need not be covered with lambs' wool and need not be driven. Indeed, in an alternate embodiment (not illustrated), the upper rollers 72 may be eliminated altogether. In their place may be provided a downwardly biased, flat, light-weight, plastic film member or lightly spring-loaded roller.

After the documents have been properly aligned against the alignment plate 80 as described above, the documents are separated. To this end, the documents are transferred "end first" by an O-ring drive mechanism 90 to a feed wheel 100 which is disposed over a retard pad 110. The O-ring drive mechanism 90 includes a plate 92 mounted to a fixed pivot pin 94 (FIG. 6) which extends in a vertically oriented elongate slot 96 defined in the plate 92. The plate 92 carries two spaced-apart rollers as best illustrated in FIG. 5—roller 102 and roller 104 about which an O-ring type drive belt 106 is disposed.

The roller 104 is freely rotatable on a shaft 107 carried by the plate 92. The roller 102 is driven by a cylindrical clutch 108 (FIG. 5) mounted to the plate 92 and carries a roller 109 for receiving a driving O-ring 112. The driving O-ring 112 is also disposed around a roller 114 mounted to a shaft 116 which is disposed for rotation in a fixed frame member 118 to which the pivot pin 94 is also mounted. The feed wheel 100 is also mounted for rotation with the shaft 114 which is driven by suitable conventional means (not illustrated) to continuously rotate the feed wheel 100, the driving O-ring 112, and the O-ring 106.

The clutch 108 is of a suitable conventional type that permits the O-ring 106 to be driven at a constant speed by the driving O-ring 112 but which also permits, in situations described in detail hereinafter, the faster rotation of the O-ring 106 independently of the rotational speed of the driving O-ring 112.

The plate 92 is movable between the raised position illustrated in FIG. 4C and the lowered position illustrated in FIGS. 6 and 7. To this end, an electric solenoid actuator 122, or other suitable operator, is mounted on the machine in a fixed relation to the plate pivot pin 94. The actuator 122 includes an arm 124 pivotally connected about a pin 126 to the plate 92. When the solenoid actuator 122 is energized, the plate 92 is lifted and tilted upwardly about the pin 94 as illustrated in FIG. 4C so as to provide clearance under the O-ring 106 for accommodating the transport of the documents into the squaring and separating station 62 against the alignment plate 80.

When the solenoid operator 122 is deenergized, the plate 92 is lowered and pivots downwardly about the pin 94 to bring the rotating O-ring 106 into engagement with the upwardly facing surface of the invoice 24 as best illustrated in FIGS. 6 and 7.

The O-ring 106, which is continuously rotating in the clockwise direction as viewed in FIG. 6, presses the documents against the idler rollers 84 and 86. As best illustrated in FIG. 6, the documents are slightly "wrapped" around a portion of the curvature of each of the idler rollers 84 and 86. The documents 30 and 24 are thus pressed together between the O-ring 106 on the top and the idler rollers 84 and 86 on the bottom. This provides sufficient frictional force between the two documents so that the rotating O-ring 106 functions to move the two documents together, without any significant slippage between the two documents, over the freely rotatable idler rollers 84 and 86 and out from between the upper rollers 72 and the lower rollers 70.

The two documents 24 and 30 are fed endwise (toward the left as illustrated in FIG. 6) to the feed wheel 100 and retard pad 110. In the squaring and separating station 62, the check 30, which is typically shorter than the invoice 24, is randomly located lengthwise relative to the length of the overlying invoice 24. That is, neither of the end edges of the check 30 is necessarily in registry with an end edge of the invoice 24. Typically, as the documents begin moving toward the feed wheel 100, the leading edge of the check 30 is disposed somewhat rearwardly of the leading edge of the invoice 24 as illustrated in FIG. 6.

As both documents are fed to the feed wheel 100, the leading edge of the invoice 24 reaches the feed wheel 100. The feed wheel 100 is continuously rotating and has a resilient, serrated or toothed periphery which, in the absence of any documents, contacts the underlying retard pad 110 (FIG. 8). The resilient serrations on the feed wheel 100 engage the top surface of the invoice 24 and feed it further forwardly into the processing path downstream of the feed wheel (to the left of the feed wheel as viewed in FIG. 6).

The linear speed of the O-ring 106, which is still in contact with the upper surface of the trailing portion of the invoice 24, is slightly less than the circumferential linear speed of the feed wheel 100. Thus, the invoice 24 does not buckle against the feed wheel 100. Rather, the feed wheel 100 pulls the invoice 24 through at a slightly greater speed than the speed at which the invoice was being fed to the feed wheel 100 by the O-ring 106.

The frictional force of the upper surface of the invoice 24 against the O-ring 106 causes the O-ring 106 to be rotated at a greater speed than the normal speed at which it is driven by the driving O-ring 112. This is accommodated by the clutch 108 which permits the overrunning condition of the O-ring 106 while the driving O-ring 112 continues at a constant speed of rotation.

As the invoice 24 is being fed under, and by, the feed wheel 100, the leading edge of the check 30 approaches the feed wheel owing to the friction between the bottom surface of the invoice 24 and top surface of the check and owing to the minimal resistance imposed by the freely rotatable idler rollers 84 and 86 under the check. The leading end of the check is ultimately stopped, however, on the retard pad 110.

The retard pad 110, which is fabricated from a foamed polyurethane material, has a surface which provides sufficient frictional resistance, when it is in contact with a leading end portion of the check 30, to prevent further movement of the check 30 as the overlying invoice 24 is fed by the feed wheel 100. The leading edge of the check 30 is stopped at, or slightly upstream of, the point of tangency of the feed wheel 100 with the retard pad 110 (FIG. 8).

As the invoice 24 feeds further forwardly, the trailing portion of the invoice begins to "uncover" the check 30. This permits the O-ring to directly contact the upper surface of the check 30. If the leading end of the check 30 had stopped a few millimeters upstream of the vertical centerline of the feed wheel 100, then the additional frictional feeding force imposed by the O-ring 106 on the partially exposed portion of the upper surface of the check 30 eventually becomes great enough (as more and more of the check becomes uncovered and contacted by the O-ring 106) to move the check further forwardly (to the left as viewed in FIG. 6) so that more of the check is on the retard pad 110 below the feed wheel 100.

At this point, the increased contact between the check 30 and the retard pad 110 is sufficient to prevent further movement, notwithstanding the combination of feeding forces resulting from the friction of the moving invoice 24 and the O-ring 106. The O-ring 106 then just slips over the upper surface of the exposed portion of the check 30 until the invoice 24 has passed completely beyond the feed wheel. At this point, the feed wheel 100 directly contacts the upper surface of the leading edge of the check 30. The force of the resilient feed wheel 100 on the upper surface of the check 30 is sufficient to overcome the frictional retarding effect of the underlying retard pad 110. Thus, the feed wheel 100 feeds the check forward and into the path downstream of the feed wheel 100.

The O-ring 106 is raised after both documents have been separated and fed past the feed wheel 100 so that the O-ring drive mechanism 90 is ready to receive the next pair of documents at the squaring and separating station 62.

The path downstream of the feed wheel 100 is defined by a set of smooth upper idler rollers 132 and a set of lower driven rollers 134 which are preferably metal rollers with grooved or serrated cylindrical surfaces. The rollers 134 are driven by suitable special or conventional drive means (not illustrated), such as a suitable chain drive system. In a preferred embodiment illustrated, the rollers are spaced apart on about 2.4 inch centers, and for a typical 6 inch long personal check, two sets of upper and lower rollers would always be in contact with the check 30. Two sets of upper and lower rollers would also be in contact with the invoice 24 which is typically longer than a personal check.

It is typically desirable to have some amount of spacing between the leading invoice 24 and the trailing check 30 to accommodate subsequent processing of the individual documents. To this end, the rollers 134 downstream of the feed wheel 100 are driven with a circumferential linear speed that is greater than that of the feed wheel 100.

In one preferred method of operation, the driven rollers 134 are driven so that the circumferential speed of each of the rollers 134 is twice that of the circumferential speed of the feed wheel 100. This will provide a space between the trailing end of the invoice 24 and the leading end of the following check 30 that is equal to the length of the check 30 as will next be explained with reference to FIGS. 9A, 9B, and 9C.

In FIG. 9A, the feed wheel 100 has just engaged the leading edge of the invoice 24. The check 30 lies under the invoice 24. Downstream of the feed wheel 100, the preceding check 30' is being conveyed by the driven rollers 134 at a linear speed that is twice the circumferential speed of the feed wheel 100.

When the leading end of the invoice 24 is fed into the rollers 132 and 134 as illustrated in FIG. 9B, the rollers contact the surfaces of the invoice 24 and attempt to pull it at twice the speed at which it is being fed by the feed wheel 100. However, the coefficient of friction between the rollers and the invoice 24 is low enough that the driven rollers 134 slip against the invoice and cannot pull it faster than it is being fed by the feed wheel 100.

Eventually, the invoice 24 clears the feed wheel 100 completely, and the rollers 132 and 134 convey the invoice at twice the feed speed of the feed wheel 100. As the invoice 24 is being fed downstream beyond the feed wheel 100, the check 30 is fed forward by the feed wheel 100 as illustrated in FIG. 9C. The check has a length L as indicated in FIG. 9C, and that entire length L must feed past the feed wheel 100.

As in the case of the invoice 24, the leading end of the check 30 that is engaged by the rollers 132 and 134 is not pulled any faster than the feed wheel speed because the driving rollers 134 do not have a sufficient frictional engagement with the check to overcome the feed wheel. Thus, the driving rollers 134 slip as necessary against the underside of the check 30.

When one-half of the check 30 has been fed a distance L/2 beyond the vertical centerline of the feed wheel 100 as illustrated in FIG. 9C, the trailing end of the downstream invoice 24 has moved a distance L from the vertical center-line of the feed wheel 100 since the conveying speed of the driven rollers 134 is twice the feed speed of the feed wheel 100. When the last half of the check 30 has just cleared the feed wheel 100, the trailing end of the invoice 24 has necessarily been conveyed a distance 2L from the vertical center-line of the feed wheel. Since the leading end of the check 30 will at that instant be a distance L from the vertical center-line of the feed wheel, there will be a spacing between the invoice and check equal to L, the length of the check.

Next, if another invoice were immediately fed by feed wheel behind the check 30, the spacing between the leading check 30 and that next following invoice would be equal to the length of that next invoice. However, the spacing is typically greater than this because the next invoice and its associated check are not fed to the feed wheel 100 by the O-ring drive mechanism 90 (FIGS. 4C and 6) until the feed wheel area has been cleared and the O-ring 106 lowered back to the engaging position illustrated in FIG. 6. The time period measured from when the trailing edge of the check clears the feed wheel to when the next document pair is conveyed by the O-ring 106 to the feed wheel can be regulated by suitable timers or document sensors in the document paths. The selected time period between the feeding of successive document pairs by the O-ring drive 90, as well as the particular details of conventional control systems that may be employed at the option of the designer, form no part of the present invention.

With reference to FIGS. 1 and 4B, the documents are continued to be conveyed downstream of the feed wheel 100 by the rollers 134 over a first optical character reader 140 and under a second optical character reader 142. The optical character readers 140 and 142 may be of a suitable special or conventional design for reading the ABA characters on a check both forwardly and rearwardly. That is, although the ABA characters are normally read from left to right, the optical character readers 140 and 142 can distinguish the characters even if the check is oriented so that the ABA characters pass the optical character reader beginning with the "last" ABA character in a line and ending with the "first" ABA character.

The optical character readers can distinguish the ABA characters, a blank face, and a non-blank face containing non-ABA characters. The reader 140 is offset toward the front lateral side of the conveying path and the reader 142 is offset toward the rear lateral side of the conveying path.

Downstream of the optical character readers 140 and 142 are conventional document sensors 146 and 148. The sensors may be of the conventional photoelectric cell type. Sensor 146 is laterally offset by an amount that clears the lateral edge of the check 30 while still being in position to sense the wider invoice 24.

Although not illustrated, conventional deskewing devices (not illustrated) may be provided immediately downstream of the feed wheel 100. Such devices function to align longitudinal edges of the documents parallel to the conveying direction against a suitable side guide (not illustrated). For example, conventional deskewing idler rollers may be provided for engaging the upper surfaces of the documents. Each such roller is conventionally mounted for rotation about a horizontal axis, but is also pivotable about a vertical axis perpendicular to the document surface. A suitable spring is provided to turn each roller toward the side guide. This urges the engaged document toward the side guide as the document is conveyed away from the feed wheel 100 under the deskewing rollers. The employment or non-employment of a deskewing mechanism, as well as the details of such deskewing mechanisms, form no part of the present invention.

Sensor 148 is disposed over the document path to sense the leading end of each check and invoice passing below it.

With reference to FIG. 4A, the documents are conveyed from the path 66 to either of two intermediate transport paths as determined by a gate 150 which may be actuated by suitable conventional means (e.g., electric solenoid actuator) to gate a document to a first intermediate transport means conveyor 152 defining the first intermediate transport path or to a second intermediate transport means or conveyor 154 defining a second intermediate transport path.

The first intermediate transport means 152 comprises pairs of endless belts 153 and 156 supported and driven by conventional rollers through appropriate drive means (not illustrated) so as to carry a document to a chute 158 which directs the document to conveyor belt 162 carried by suitable rollers and driven by appropriate conventional means (not illustrated).

If the gate 150 is pivoted to a deflecting position (as in FIG. 12), the document is guided upwardly and carried by spaced belt pairs 166 and 168 to the second intermediate transport means 154. The second intermediate transport means 154 is a conventional, twisted belt inverter conveyor 170 which includes a continuous, circular cross-section belt of friction material disposed around four rollers or pulleys in a figure eight configuration as taught by U.S. Pat. No. 2,947,406. The rollers are driven by conventional means (not illustrated). This functions, as is well-known in the art, to convey the document while at the same time inverting the document lengthwise 180° about its long or horizontal axis. The inverting conveyor 154 discharges the inverted document to a guide 186 and adjacent endless belt pairs 188 which carry the document into belt pairs 190.

Belts 190 carry the document from the guide 186 down to the belt 162. The belt 162 carries the inverted documents from the belts 190 and carries the non-inverted documents from the chute 158 to a common transport path defined by a conveyor 200. The conveyor 200 includes a transport means comprising lower driven rollers 202 and upper idler rollers 204.

Figure 10:
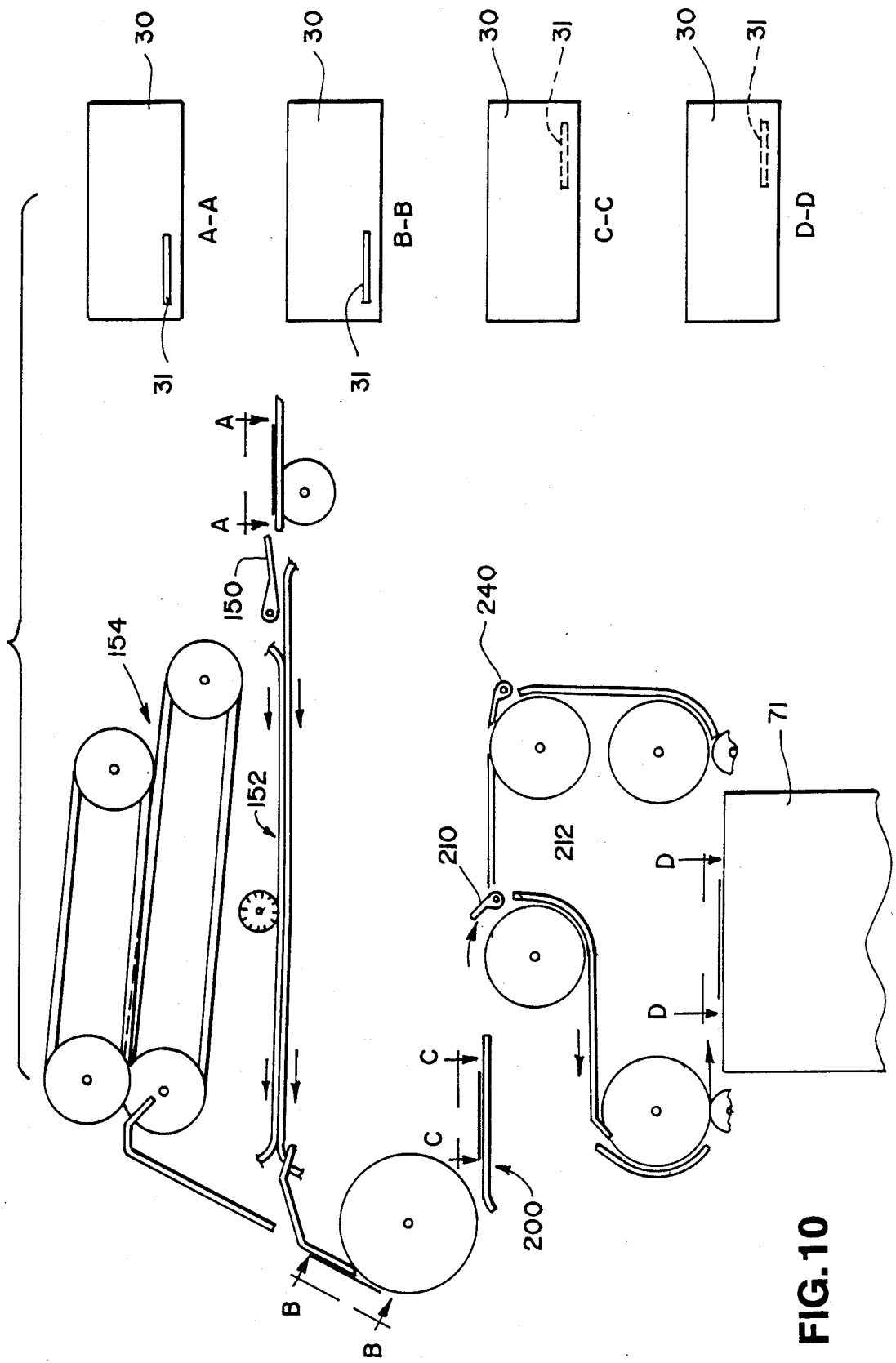
FIGS. 10, 11, 12, and 13 are fragmentary, simplified, front elevational, diagrammatic views similar to FIG. 4A of the orienting portion of the apparatus to illustrate the processing of a check having each of four initial orientations.

At the end of the common conveyor 200 is a gate 210 which is operable by suitable conventional means (e.g., an electric solenoid actuator (not illustrated)) between the horizontal "pass-through" position illustrated in FIG. 4A and an upwardly pivoted, "deflecting" position illustrated in FIG. 10.

When the gate 210 is in the upwardly angled deflecting position, the documents are guided into a first discharge conveyor 212 that defines a first discharge path. The first discharge conveyor 212 includes a large roller 214 at the conveyor inlet and a large roller 216 at the conveyor outlet. A guide 220 directs the document around the roller 214 and adjacent another guide 222. A curved guide 224 is provided adjacent the roller 216 for guiding the documents around the roller 216. An idler roller 226 is provided below the roller 216, and the documents are discharged from between the rollers 216 and 226 into the first receiver 71.

A second discharge conveyor 230 is provided downstream of the gate 210 to define a second discharge path and includes a drive roller 232 and idler rollers 234. A gate 240 is provided adjacent the second discharge conveyor 230 and is movable by suitable conventional means (e.g., an electric solenoid actuator (not illustrated) between a lowered "pass-through" position illustrated in FIG. 4A in solid lines and an upwardly angled, "deflecting" position illustrated in dashed lines. A large diameter drive roller 244 is mounted adjacent the gate 240. When the gate 240 is in the upwardly tilted deflecting position, documents are deflected around the drive roller 244.

An idler roller 246 is mounted below the gate 240 adjacent the drive roller 244. Documents are fed between the idler roller 246 and drive roller 244 downwardly alongside a guide 248 adjacent a drive roller 250. An idler roller 252 is mounted below the drive roller 250, and the documents are discharged into the receiving bin 71 from the second discharge conveyor 230 from between the rollers 250 and 252.

Preferably, the path lengths of the first discharge conveyor 212 and of the second discharge conveyor 230 are substantially the same. That is, the document transport path along the first discharge conveyor 220 from the gate 210 to the large discharge roller 216 has the same length as the document transport path in the second discharge conveyor 230 from the gate 210 to the large discharge roller 250. This means that the travel time of a document along either conveyor 212 or 230 will be the same. This permits documents to be discharged to the receiving bin 71 from either discharge conveyor 212 or 230 in the same order that the documents have in the upstream common transport path 200.

When the receiving bin 71 is filled, the documents may be automatically discharged to a second receiving bin 71'. To this end, and with reference to FIGS. 4A and 4B, a transfer conveyor 260 is provided to receive the documents from the second discharge conveyor 230 when the gates 210 and 240 are in the lowered "pass-through" positions illustrated in solid lines in FIG. 4A.

The transfer conveyor 260 conveys the documents to the second bin 71' via an alternate first discharge conveyor 212' or an alternate second discharge conveyor 230'. A gate 210' is provided at the downstream end of the transfer conveyor 260 for being operated (by suitable means, such as an electric solenoid actuator, not illustrated) between a lowered position and an upwardly pivoted deflecting position, in the same manner as gate 210 described above, so as to select either the alternate first discharge conveyor 212' or the alternate second discharge conveyor 230'. The alternate first and second discharge conveyors 212' and 230', respectively, have the same configuration as, and operate in the same manner as, the above-described first and second discharge conveyors 212 and 230, respectively.

Adjacent the transport path of the second discharge conveyor 230' is a gate 240' which is movable, by suitable means (e.g., an electric solenoid actuator (not illustrated)) between a lowered "pass-through" position illustrated in solid lines in FIG. 4B and an upwardly tilted "deflecting" position illustrated in phantom with dashed lines in FIG. 4B. The gate 240' functions in a manner similar to the above-described gate 240 for deflecting the documents along the path of the alternate second discharge conveyor 230' when the gate 240' is in the upwardly slanting position.

When the gate 240' is in the horizontal "pass-through" position as illustrated in solid lines in FIG. 4B, documents are conveyed out of the alternate second discharge conveyor 230' and into a rejected document conveyor 270. The conveyor 270 includes a drive roller 272 and idler roller 274 which feed the documents against a guide 276 around a large drive roller 278 which in turn feeds the documents between guides 280 and 282 and around a large drive roller 290. The large drive roller 290 discharges the documents into the rejection bin 77.

The operation of the orienting portion of the machine will next be described with respect to pairs of documents in which the check 30 may have any one of four possible orientations.

First, for a given pair of document's consisting of the invoice 24 and check 30, the invoice 24 is fed from the feed wheel 100 along the sensing path (arrow 66 in FIGS. 1, 4A, 4B, and 4C). It will be recalled that the invoice 24 is extracted from the envelope 20 at the extracting station 58 in a face-up orientation with the bottom edge of the document extending toward the front of the machine and with the top edge of the invoice extending toward the rear of the machine.

As the invoice 24 passes the sensor 146 (FIGS. 1 and 4B), the sensor 146 detects the invoice (which is wider than the check 30 that would not be sensed by the laterally displaced sensor 146). The leading edge of the invoice 24 is also detected by the sensor 148. This information is stored in the control system by conventional microprocessor means as an indication that the document is the invoice 24.

The invoice 24 is fed past the gate 150. The gate 150 is maintained in the "pass-through" orientation illustrated in solid line in FIG. 4A for each document that is detected by the sensors 148 and 146 as an invoice document. The invoice 24 is carried along the first intermediate transport conveyor 152 and ultimately to the common transport conveyors 162 and 200.

The control system is programmed to move the gate 210 to the deflecting position illustrated in dashed lines in FIG. 4A so as to guide the invoice 24 into the first discharge conveyor 212. The invoice 24 then is discharged into the receiving bin 71 in a face-down position. The bottom edge of the invoice 24 is adjacent the front edge of the receiving bin 71, and the top edge of the face-down invoice 24 extends toward the rear of the machine.

The check 30 that follows the invoice 24 passes the optical character readers 140 and 142 (FIG. 4B). If the check is face up, the lower optical character reader 140 will register a blank rear face. Such a face-up check then passes the upper optical character reader 142. It is to be recalled that the upper optical character reader 142 is installed laterally offset in the path so as to recognize the ABA characters 31 if the check is oriented so that the ABA characters 31 are located along the rearward lateral edge of the conveying path (e.g., as illustrated in view A—A in FIG. 13). If the face-up check is oriented with the ABA characters located along the front edge of the path (e.g., view A—A in FIG. 10), then the reader 142 will just register the presence of non-ABA characters. Thus, if the lower optical character reader 140 registers a blank face, and the upper optical reader 142 reads ABA characters, then the check can only be in the orientation illustrated in view A—A in FIG. 13.

Consider a second alternative. If the lower optical character reader 140 registers a blank face but the upper optical reader 142 registers optical characters that are not the ABA characters, then the check must have the upwardly facing orientation illustrated in view A—A in FIG. 10.

Before considering a third alternative, it is to be recalled that the lower optical character reader 140 is offset toward the front lateral side of the conveying path to read the ABA characters 31 if a face-down check is oriented so that the ABA characters are along the front lateral edge of the conveying path. Thus, if the lower optical character reader 140 reads the ABA characters, the check must be face-down as illustrated in view A—A in FIG. 11.

Figure 12:
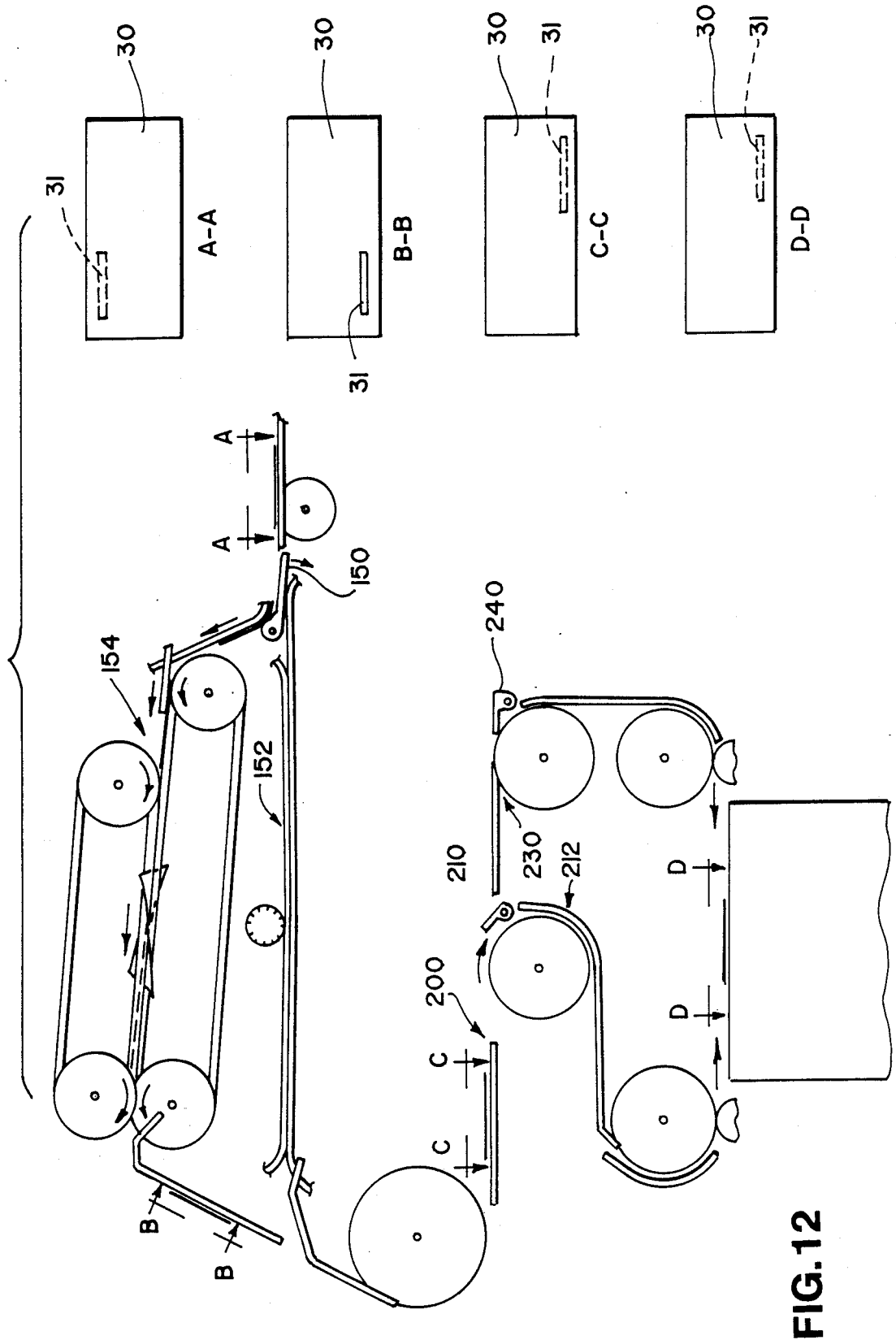

In the last alternative, if the offset lower optical reader 140 registers the presence of non-ABA characters 31, then the check must be face down, but oriented with the ABA characters along the rear lateral edge of the path as illustrated in view A—A in FIG. 12.

The control system processes the optical character reader input and identifies the orientation of the check 30. The control system then operates the gates 150, 210, and 240 as necessary to orient the check 30 so that it will be discharged into the receiver 71 in a face-down position with the ABA characters 31 adjacent the front edge of the machine (views D—D in FIGS. 11-13).

Figure 11:
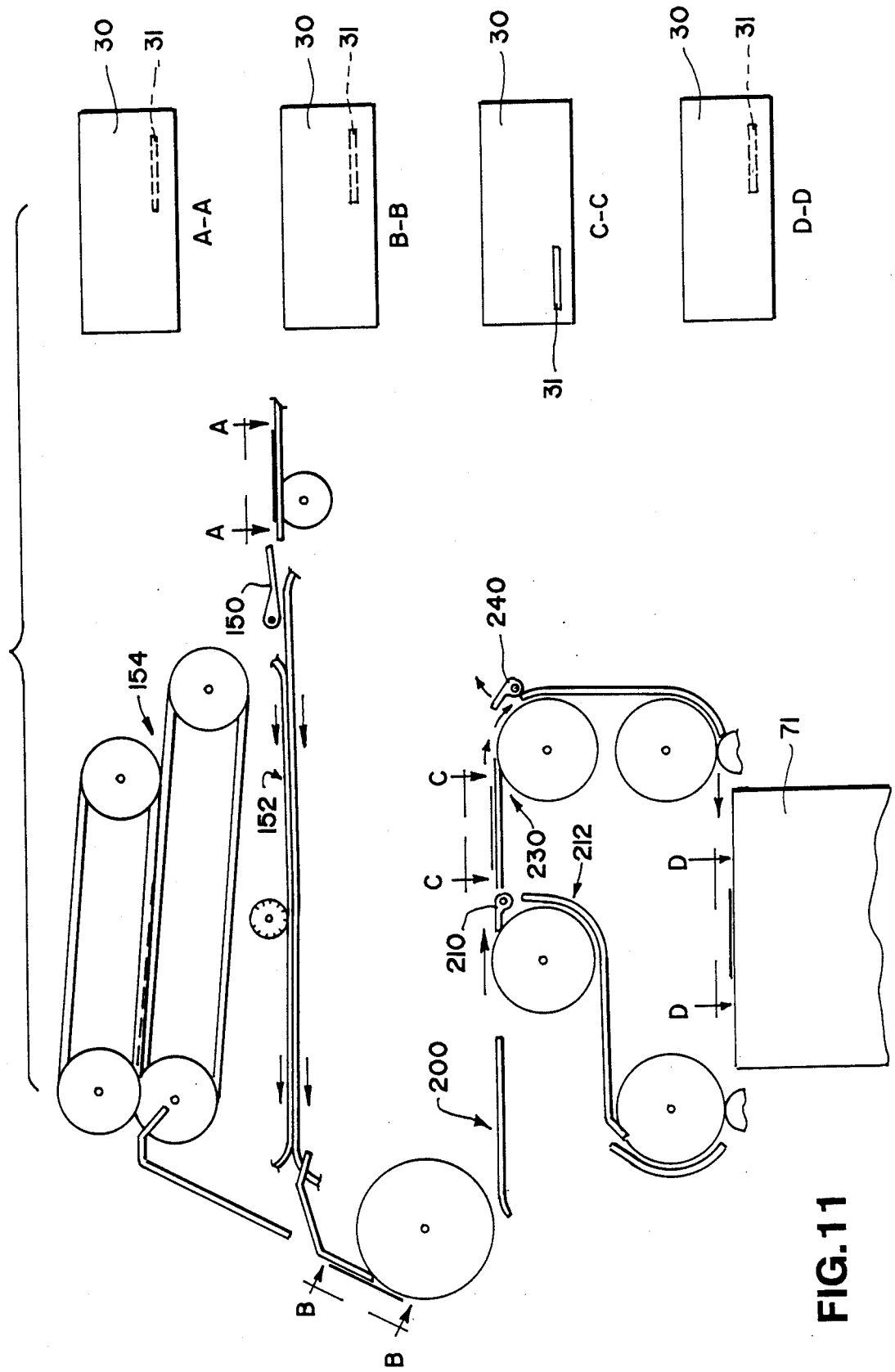

For example, if the check 30 initially has the face-down orientation illustrated in view A—A in FIG. 11, the gates 150 and 210 are maintained in the "pass-through" positions and the gate 240 is actuated to the "deflecting" position. The check is thus carried along the first intermediate non-inverting conveyor 152, along the common transport conveyor 200, and through the second discharge conveyor 230 to the receiving bin 71. The check is thus conveyed from its initial face-down orientation and is discharged face-down into the bin 71 from the right-hand end of the bin.

If the check has the initial face-up orientation illustrated in view A—A in FIG. 10, the gate 150 is maintained in the "pass-through" position but the gate 210 is actuated to the "deflecting" position. The check 30 is then conveyed along the first intermediate, non-inverting conveyor 152, along the common transport conveyor 200, and through the first discharge conveyor 212 into the receiving bin 71. This processing path turns the check face-down and discharges it into the bin 71 from the left-hand end of the bin 71.

If the check 30 has the initial face-down orientation illustrated in view A—A in FIG. 12, gates 150 and 210 are each actuated to the "deflecting" position. The check 30 is thus transported by the second intermediate, inverting conveyor 154 which turns the check longitudinally from its face-down position to a face-up position. The check continues to the common transport conveyor 200 and into the first discharge conveyor 212. The check is discharged face-down into the bin 71 from the left-hand end of the bin.

Figure 13:
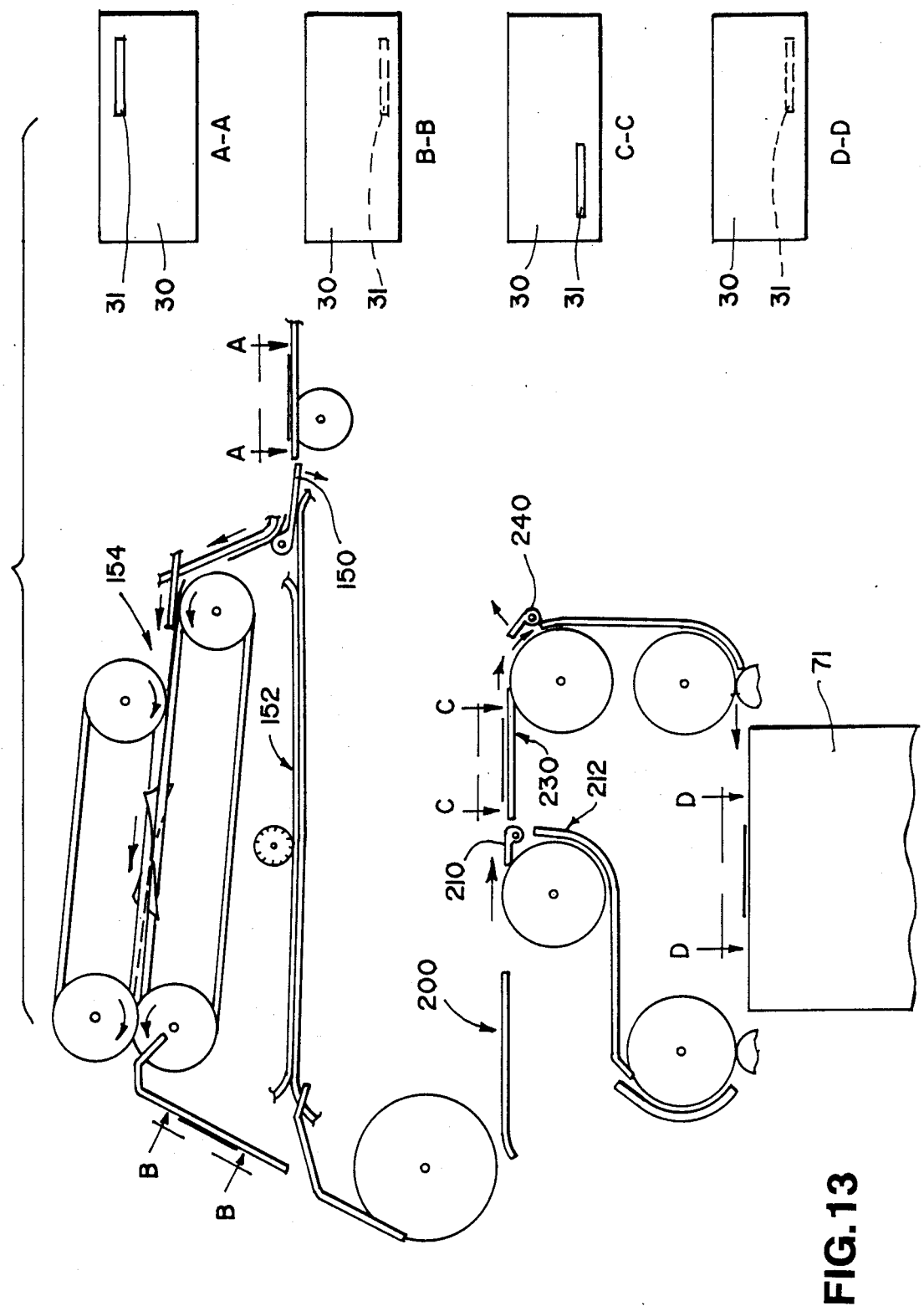

Finally, if the check 30 has the inital face-up orientation illustrated in view A—A in FIG. 13, then the gates 150 and 240 are actuated to the "deflecting" position. The check 30 is fed to the second intermediate, inverting conveyor 154 where it is inverted to the face-down orientation. The check is then fed through the common transport path 200 and into the second discharge path 230 which discharges the check face-down into the bin 71 from the right-hand end of the bin.

It will be observed from views D—D in FIGS. 11-13 that the final orientation of the check 30 in the bin 71 is the same regardless of the check initial orientation (views A—A in FIGS. 11-13). The pairs of documents extracted from the envelopes thus become stacked face-down in the bin 71 in the same orientation with the check on top of the invoice.

The above-described actuation of the gates is controlled by the sensors 146 and 148 in path 66 (FIG. 4B). The check 30 passes the sensors 146 and 148 downstream of the optical character readers 140 and 142. The check, being narrower than the invoice 24, passes by the offset sensor 146 without actuating the sensor. The leading end of the check does, however, actuate the second sensor 148. These sensor inputs thus establish that it is a check that is at the location of sensor 148 and not the wider invoice document. The control system is then permitted to actuate the gates 150, 210, and 240 to the positions required, in an appropriate timing sequence, for permitting passage of the forwardly spaced invoice 24 to the bin 71 and for discharging the check 30 into the bin 71 with the proper orientation based upon the orientation input signals from the optical character readers 140 and 142.

After the check 30 has passed the sensors 146 and 148, the next document that should be processed is the invoice of a next pair of documents extracted from an envelope. The sensors 148 and 146 would sense the leading edge and laterally extending edge, respectively, of the wide invoice document. The control system is programmed so that if the sensor 146 does not detect the wide invoice 24 following a preceding check 30, the machine 16 will be shut down.

Other malfunction detection sensors may be provided. For example, in the inverting conveyor 154, a lateral edge sensor may be provided for sensing the greater width of the invoice 24. Since no invoice should ever be directed to the inverting conveyor 154, the machine will be shut down if such a sensor were to indicate the presence of an invoice in the inverting conveyor 154.

It may also be desirable to provide a jam sensing detector in the inverting conveyor 154, as well as in the other conveyors, if desired. Such a jam sensing detector may be of the conventional type which would shut down the machine if a document is sensed at a particular position for longer than a preselected time period.

The control system is preferably programmed to automatically effect the processing of documents to the second bin 71' when the first bin 71 is filled. Appropriate conventional sensing mechanisms (not illustrated) may be provided in the bin 71 to sense the level of documents in the bin. When the documents have reached a selected height in the bin 71, that height is sensed, and a signal is sent to the control system. The control system then maintains the gates 210 and 240 (FIG. 4A) in the horizontally disposed "pass-through" orientations, and the documents pass to the alternate first and second discharge conveyors 212' and 230', respectively. The control system then operates the gates 210' and 240' in the same manner that the gates 210 and 240 were operated during the filling of the first bin 71.

A conventional sensor (not illustrated) may be provided in the second bin 71' for being actuated when the bin 71' has been filled to a predetermined level. The control system would then switch the discharge processing of the documents back to the first bin 71 which would have been emptied during the filling of bin 71'.

The reject conveyor 270 functions if the processing system cannot determine the orientation of a check. Specifically, as a leading invoice 24 and following check 30 are conveyed down the path 66 past the optical character readers 140 and 142, the optical character readers may not be able to determine the orientation of the check for one reason or another. If the optical character readers cannot determine the orientation of the document, the control system maintains all of the gates. 150, 210, 240, 210', and 240' in the horizontally disposed, "pass-through" positions so that both the leading invoice 24 and the following check 30 (or other associated document that may have been included in place of the check) are transported to the rejection bin 77.

Preferably, the various conveyors and document transporting systems in the machine 16 progressively increase the transport speed of the documents as the documents are conveyed in the machine to the receiving bin 71, 71', or 77. For example, the first and second intermediate transport conveyors 152 and 154, respectively, convey the documents at a linear speed that is slightly greater than the document speed along the path 66. Similarly, the conveying belts 190 and 162 operate at progressively greater speeds. The remaining downstream conveying mechanisms also are each operated at a slightly greater speed than the immediate upstream conveying mechanism. This reduces the possibility that the spacing between the documents would be undesirably decreased.

The above-described method and apparatus for orienting checks 30 may be employed with a variety of documents in which an initial orientation can be determined by suitable means (e.g., optical character readers, magnetically encoded document readers, aperture readers, etc.). Thus, the invention method and apparatus may be employed to orient an invoice document as well as a check. Also, the invention is not limited to particular types of documents. The documents may be of the type that are extracted from envelopes (which may or may not have windows) or the documents may not even be of the type that are used with envelopes at all.

Further, the invention method and apparatus, with appropriate modifications, can be employed with single documents that are not associated in groups. Alternatively, the method and apparatus may be employed with documents that are associated in groups of three or more documents per group.

It is seen that the method and apparatus is effective to reorient selected documents that each have first and second ends and that are disposed in a selected initial location in a common transport path (e.g., common transport path 66 or common transport conveyor 200). Some of the documents (checks 30) initially have a first end-defined orientation wherein the first end leads the trailing second end. Others of the documents (checks 30) initially have a second end-defined orientation wherein the second end leads the trailing first end. The method and apparatus is effective to reorient the documents so that all documents are discharged to a receiving station with the same end orientation relative to the receiving station or fixed coordinate reference system.

The method and apparatus may further be employed with documents that can have either one of two face orientations so that the documents may be reoriented as desired either face-up or face-down in addition to being oriented with a particular end orientation.

It is seen that the novel method and apparatus for placing the selected documents in the desired end orientation downstream of the feed wheel 100 operate to process the documents in a way that does not require the stopping of the documents or that does not require abruptly changing the direction of movement of the leading end of a document. Each document may be transported to a receiving station through paths in which the document leading end remains the leading end at all times during the conveying process. The conveying system can thus be constructed to move the documents substantially in an X, Y plane of the conventional X, Y, Z orthogonal coordinate system without requiring movement of the documents in the Z-direction. The document handling system can thus be relatively compact.

It will be readily observed from the foregoing detailed description of the invention and from the illustrated embodiments thereof that numerous variations and modifications may be effected without departing from the true spirit and scope of the novel concepts or principles of this invention.

What is claimed is:

1. A method for discharging, to a receiving station, selected documents that each have first and second ends and that are disposed in a common transport path with some of the selected documents in a first end-defined orientation wherein the first end leads the trailing second end and with others of the selected documents in a second end defined orientation wherein the second end leads the trailing first end, each said selected document being a second document of a pair of associated first and second documents initially arranged in a face-to-face relationship, said method comprising the steps of:

separating said first document from said selected second document for each pair of documents;

transporting said separated first and second documents of each document pair seriatim along a sensing path with said first document leading said second document;

transporting said first document from said sensing path sequentially along a common transport path and then along one of first and second discharge paths into said receiving station;

sensing predetermined characteristics on each said second document in said sensing path to determine the existing orientation of the ends of each said second document;

identifying those said second documents having said first end-defined orientation as a function of the sensed characteristics, gating each said first end-defined orientation second document from said common transport path into said first discharge path, and transporting each selected first end-defined orientation second document with said first end leading said second end from said common transport path along said first discharge path into said receiving station from one end of said receiving station, and identifying these said second documents having said second end-defined orientation as a function of the sensed characteristics, gating each said second end-defined orientation second document from said common transport path into said second discharge path, and transporting each selected second end-defined orientation second document with said second and leading said first end from said common transport path along said second discharge path into said receiving station toward said receiving station one end from another end of said receiving station that is opposite said receiving station one end whereby all said selected second documents in said receiving station have the same end orientation.

2. Apparatus for discharging, to a receiving station, selected documents that each have first and second ends and that are disposed with some of the selected documents in a first end-defined orientation wherein the first end leads the trailing second end and with others of the selected documents in a second end-defined orientation wherein the second end leads the trailing first end, said apparatus comprising:

an open-top receiving bin included in said receiving station defining a rectangular opening and having one end and in opposite other end;

a common transport conveyor defining a common transport path in which said selected documents are conveyed seriatim;

first transport means for transporting each selected first end-defined orientation document with said first end leading said second end into said receiving station bin from one end of said receiving station bin, said first transport means including a first discharge conveyor branching from said common transport path and extending to said receiving station bin one end to discharge said first end-defined orientation documents into said bin over said bin one end;

second transport means for transporting each selected second end-defined orientation document with said second end leading said first end into said receiving station bin toward said receiving station bin one end from said other end of said receiving station bin that is opposite said receiving station bin one end whereby all said selected documents in said receiving station bin have the same end orientation, said second transport means including a second discharge conveyor branching from said common transport path and extending to said other end of said receiving bin to discharge said second end-defined orientation documents into said bin over said bin other end toward said bin one end;

a rejected document transport conveyor branching from said second discharge conveyor; and a gating means in said second discharge conveyor for directing rejected ones of said documents out of said second discharge conveyor.

3. Apparatus for discharging, to a receiving station, selected documents that each have first and second ends and that are disposed with some of the selected documents in a first end-defined orientation wherein the first end leads the trailing second end and with others of the selected documents in a second end-defined orientation wherein the second end leads the trailing first end, each said selected document being a second document of a pair of associated first and second documents initially arranged in a face-to-face relationship, said apparatus comprising:

first transport means for transporting each selected first end-defined orientation second document with said first end leading said second end into said receiving station from one end of said receiving station;

second transport means for transporting each selected second end-defined orientation second document with said second end leading said first end into said receiving station toward said receiving station one end from another end of said receiving station that is opposite said receiving station one end whereby all said selected second documents in said receiving station have the same end orientation;

separating means for separating said first document from said selected second document for each pair of documents;

initial common transport means for transporting said separated first and second documents of each document pair seriatim along a sensing path with said first document leading said second document;

a final common transport means downstream of said initial common transport means for transporting said first and second documents to one of said first transport means and said second transport means;

a first intermediate transport means for transporting said second document from said initial common transport means directly to said final common transport means;

a second intermediate transport means for receiving said second document from said initial common transport means and inverting said second document face orientation and then directing said inverted second document to said final common transport means;

sensing means for sensing predetermined characteristics on each said second document in said sensing path of said initial common transport means to determine the existing orientation of the faces and ends of each said second document; and initial gating means for gating each said second document from said sensing path into one of said intermediate transport means as a function of the sensed characteristics.

4. Apparatus for automatically orienting selected documents that each have first and second ends, that each have first and second lateral edges, that each have a predetermined characteristic on one face laterally offset toward one lateral edge of the document, and that are being transported from an initial location along a common path endwise with either one of the document ends being a leading end and the other of the document ends being a trailing end, said apparatus comprising:

first and second discharge paths branching from said common path;

a station for receiving said documents from said discharge paths;

first sensing means laterally offset toward one lateral edge of said common path for sensing said predetermined characteristics on one face of one of said documents;

second sensing means laterally offset toward the other lateral edge of said common path for sensing said predetermined characteristic on the other face of said one document;

controlled transport means responsive to said first and second sensing means for determining whether each document has a leading first end or a leading second end and for moving each said document with a leading first end to said receiving station from said common path via said first discharge path and for moving each said document with a leading second end to said receiving station from said common path via said second discharge path to reverse the orientation of said document end-for-end relative to its orientation at said initial location in said common path.

5. A method for orienting one type of at least two different types of documents at a receiving station, said method comprising the steps of:

(A) moving said documents along a path;

(B) while effecting step A, sensing a characteristic of one of said types of documents at an initial location in said path to identify and select said one type;

(C) while effecting step (A), moving the non-selected documents to said receiving station and moving one of said selected documents from an initial location in said path to said receiving station with one end of said selected documents leading a trailing end;

(D) while effecting step (C), maintaining the leading ends of the selected documents at non-zero velocities; and (E) while effecting steps (A) and (D), selectively reversing the end-for-end orientation of said selected documents relative to a reference coordinate system fixed in relation to said initial location and then discharging said reversed documents into said receiving station with said one end still leading the trailing end.

* * * * *